Nov. 15, 1938.  E. H. GOLDACKER  2,137,137
SANITARY PIPE COUPLING
Filed Oct. 1, 1937  2 Sheets-Sheet 1
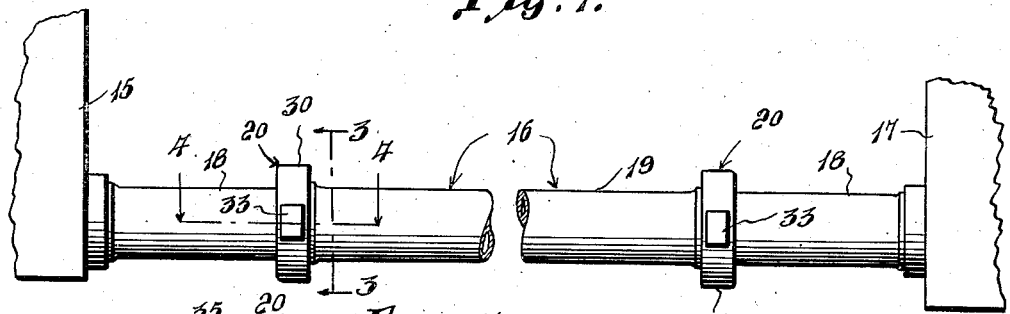
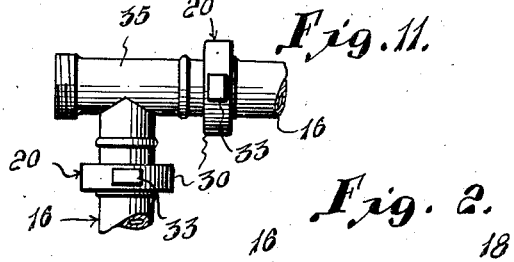
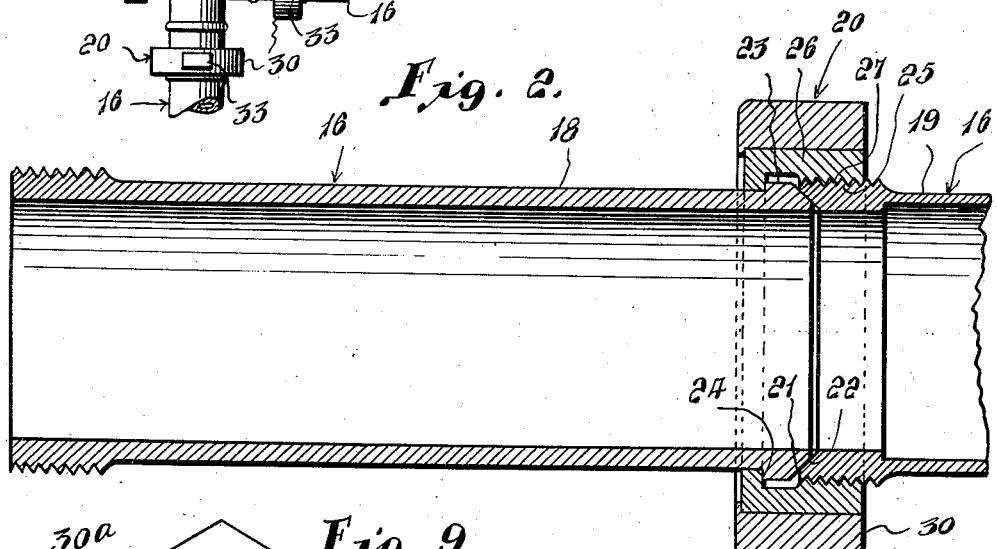
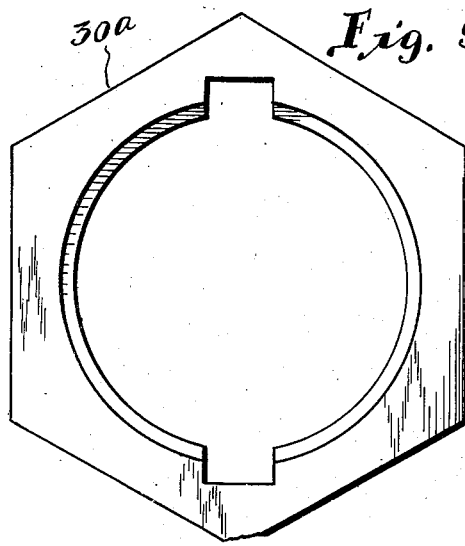
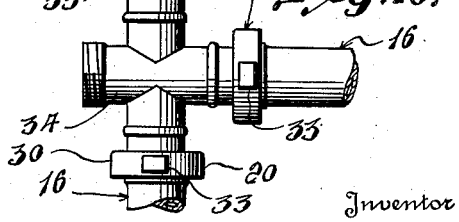
Inventor
Edward H. Goldacker
By
Attorney Nov. 15, 1938.  E. H. GOLDACKER  2,137,137
SANITARY PIPE COUPLING
Filed Oct. 1, 1937  2 Sheets-Sheet 2
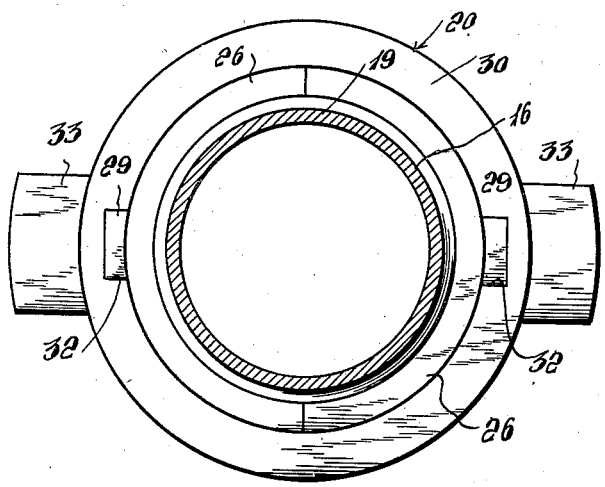
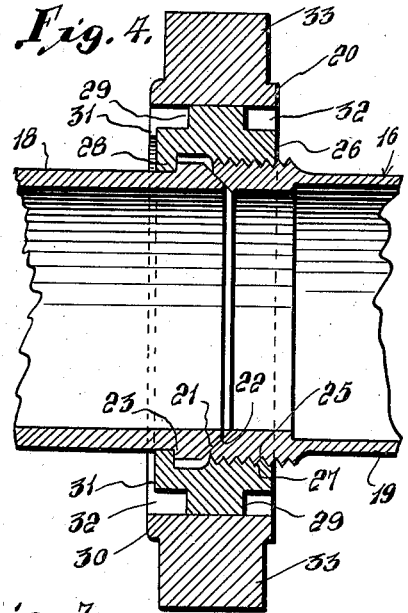
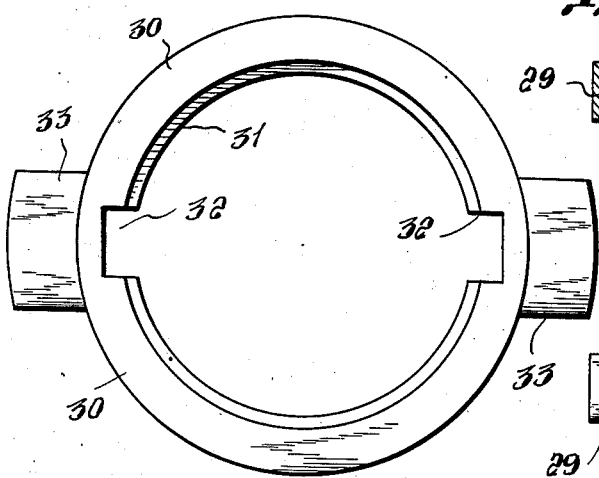
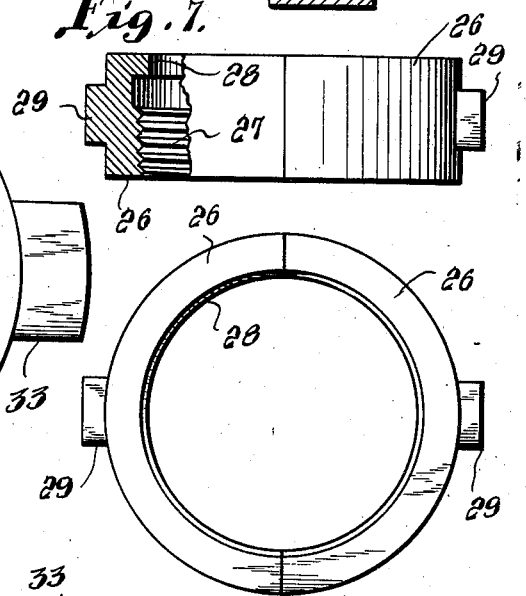
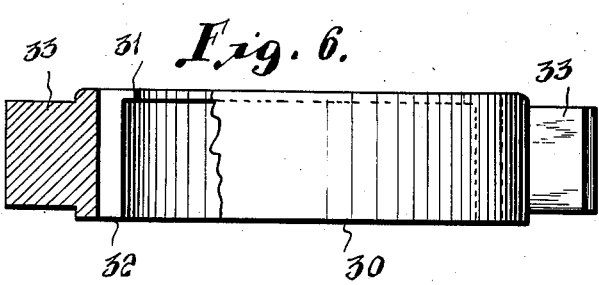
Inventor
Edward H. Goldacker
By
Attorney.

Patented Nov. 15, 1938

2,137,137

UNITED STATES PATENT OFFICE 2,137,137

SANITARY PIPE COUPLING

Edward H. Goldacker, Jamaica, N. Y., assignor of one-fourth to Casper Cacioppo, Ridgewood, N. Y., one-fourth to Charles Cacioppo, Forest Hills, N. Y., and one-fourth to Joseph Cacioppo, West Forest Hills, N. Y.

Application October 1, 1937, Serial No. 166,874

1 Claim. (Cl. 285—128)

This invention relates to certain new and useful improvements in sanitary pipe coupling for milk handling systems and also for all other uses wherein any sanitary piping is necessary.

In the treatment or handling of milk, preparatory to bottling or packaging thereof, the milk is passed through several different stages in the treatment thereof, comprising the charging of one or a series of glass lined cold storage tanks with milk and from which tanks the milk is delivered to a heater, a filter to a holder and thereafter to a cooler and a milk balance tank from which the milk is finally delivered to a bottle or package filling machine. The milk in being passed through the several foregoing stages flows through a system of piping that forms communication between the several milk treating devices and after the treatment of a quantity of milk, all of the apparatus is dismantled, including the pipe system to facilitate cleaning and sterilization of the apparatus which is thereafter assembled for further milk treatment.

The sanitary regulations require the complete dismantling of the milk treating apparatus for cleaning and sterilization after use and such apparatus necessarily includes an extensive piping system which has not heretofore been satisfactorily constructed to permit complete dis-association of all of the parts of the piping system, especially the coupling elements between pipe sections and fittings and it is the primary object of this invention to provide a sanitary pipe coupling which when dis-assembled permits complete separation of the coupling elements between pipe sections or between pipe sections and fittings for the complete cleansing and sterilization of each part of the pipe system.

With the above and other objects in view that will become apparent as the nature of the invention is better understood, the same consists in the novel form, combination and arrangement of parts hereinafter more fully described, shown in the accompanying drawings and claimed.

In the drawings:—

Figure 1 is a fragmentary side elevational view, partly broken away of part of a milk handling system or apparatus, showing a pipe connection formed of sections with pipe couplings between two devices of milk handling apparatus, such as a cold storage tank and a heater;

Figure 2 is a fragmentary longitudinal sectional view of two pipe sections with the sanitary coupling therebetween permitting complete separation of the ends of the pipe sections and all parts of the coupling;

Figure 3 is a cross-sectional view taken on line 3—3 of Figure 1, showing the interlocking connection between the clamping ring and split collar sections of the coupling;

Figure 4 is a detail sectional view taken on line 4—4 of Figure 1, showing the slidable interlocking connection between the clamping ring and split collar section of the coupling;

Figure 5 is a plan view of the clamping ring showing diametrically opposite recesses therein for receptoin of outwardly projecting lugs on the sections of the split collar;

Figure 6 is a side edge elevational view of the clamping ring, partly broken away and shown in section;

Figure 7 is a side edge elevational view, partly broken away and shown in section of the split collar of the coupling;

Figure 8 is a top plan view of the split collar;

Figure 9 is a plan view of another form of clamping ring, the same having an outer surface of hexagonal form;

Figure 10 is a fragmentary elevational view of a four-way fitting equipped with the sanitary completely separable coupling; and Figure 11 is a fragmentary elevational view of a T-fitting equipped with the sanitary completely separable pipe coupling.

Sanitation laws controlling the operation of dairies in the treatment of milk preparatory to bottling or packaging thereof require complete dismantling of the milk treating apparatus after a quantity of milk has flowed therethrough for the cleaning and sterilization of such apparatus including all vats, tanks, heaters and the like together with all pipe lines and fittings or couplings in the pipe lines and between the pipe lines and the milk treating devices, a part of such milk treating apparatus being fragmentarily illustrated in Fig. 1, wherein the reference character 15 designates a cold storage tank having a pipe line connection designated in general by the reference character 16 with a milk heater vat or receptacle 17.

The present invention is more particularly concerned with the pipe line connection 16 between the several milk treating devices and especially a sanitary coupling between pipe sections and pipe sections and fittings with the coupling constructed in a manner to permit complete dis-association of all parts thereof for cleansing and sterilization. The pipe line 16 as shown in Fig. 2 includes two pipe sections 18 and 19 assembled in end abutting relation and joined together by a sanitary pipe coupling designated in general by the reference character 20. The abutting end of the pipe sections 18 and 19 are bevelled as at 21 and 22 respectively, the pipe sections 18 constituting the male member while the pipe section 19 constitutes the female member. The bevelled end 21 of the male pipe section 18 is surrounded by an annular enlargement 23 defining an abutment shoulder 24 while the bevelled end 22 of the female pipe section 19 is externally threaded as at 25, the sanitary pipe coupling 20 being engaged with the abutment shoulder 24 of the male pipe section 18 and the threaded end 25 of the female pipe section 19 for holding the two pipe sections in assembled relation.

The sanitary pipe coupling 20 is shown more clearly in Figs. 2 to 8 and includes a collar formed of two split sections 26 internally threaded as at 27, it being understood however, that the collar may be split into two or more sections. An inwardly directed annular flange 28 is formed at corresponding ends of the split collar sections 26 and is adapted for engagement with the abutment shoulder 24 on the male pipe section 18 as shown in Figs. 2 and 4, the internally threaded portions 27 of the split collar sections being positioned for engagement with the threaded portion 25 of the female pipe section 19. A pair of diametrically opposite lugs 29 projects outwardly of the split collar sections 26, one of said lugs being carried by each collar section and adapted for slidable interlocking connection with the clamping ring 30 shown in detail in Figs. 5 and 6.

The clamping ring 30 carries an inwardly directed annular flange 31 at one edge thereof and is proportioned for snug surrounding engagement with the split collar sections 26, the flange 31 on the clamping ring 30 being moved into engagement with the flanged end 28 of the split collar. A pair of diametrically opposite recesses 32 is formed in the inner side of the clamping ring 30 for the slidable interlocking reception of the outwardly directed lugs 29 on the split collar sections 26 and said clamping ring 30 carries a pair of diametrically opposite spanner wrench receiving lugs 33 to facilitate assembly of the male and female pipe sections 18 and 19 and the assembly of the parts forming the sanitary pipe coupling.

Assuming the several elements constituting the sanitary pipe coupling to be dis-assembled as well as the male and female pipe sections 18 and 19 and it being desired to assemble such elements after cleansing and sterilization thereof, the clamping ring 30 is first placed upon the male pipe section 18 at a point remote from the bevelled end 21 thereof, the two split collar sections 26 being then assembled on the tapered end of the male pipe section 18 with the annular flange 28 on the split collar engaged with the abutment shoulder 24 on the male pipe section. The clamping ring 30 is then slid into position on the split collar with the outwardly directed lugs 29 on the split collar received in the diametrically opposite recesses 32 in the clamping ring, the inwardly directed annular flange 31 on the clamping ring being engaged with the flanged end of the split collar. The threaded end 25 of the female pipe section 19 is then introduced into the threaded portion 27 of the split collar and upon rotation of the clamping ring 30, as by a spanner wrench or the like, the split collar is rotated therewith for causing the female pipe section 19 to be threaded into the sanitary coupling 20 with the bevelled ends 21 and 22 of the male and female pipe sections respectively moving into tight frictional engagement with each other. It will at once be appreciated that all of the parts of the sanitary pipe coupling 20 are dis-associated from each other and also from the pipe sections 18 and 19 when the pipe connection 16 is disassembled for cleaning and sterilization thereof to meet the requirements of sanitation laws governing the handling of milk in treating the same preparatory to bottling or packaging thereof.

The clamping ring 30 shown in Fig. 5 has been described as an annulus provided with spanner wrench receiving lugs 33, but it is to be understood as shown in Fig. 9 that other forms of clamping rings may be employed, such as the hexagonal clamp device 30a to which an ordinary wrench may be applied in assembling and tightening the sanitary pipe coupling.

It is also intended that the sanitary pipe coupling be associated with various types and forms of fittings, a four-way fitting 34 being shown in Fig. 10, while a T-fitting 35 is shown in Fig. 11, the sanitary pipe coupling 20 being employed for connecting the pipe sections 16 to the fittings.

From the above detailed description of the invention, it is believed that the construction and operation thereof will at once be apparent and while there are herein shown and described the preferred embodiments of the invention, it is nevertheless to be understood that minor changes may be made therein without departing from the spirit and scope of the invention as claimed.

I claim:—

In a quick detachable sanitary pipe coupling, male and female pipe sections having abutting beveled ends, a split collar rotatable on one of the abutting ends and threadedly engaging the other and cooperatively constructed with respect to said abutting ends to effect movements of the ends towards each other upon rotation thereof after engagement with threads on one pipe end, means for holding the split collar in assembled relation on the pipe sections and interlockingly engaged with the split collar and constituting the rotating means for the split collar, said means including a clamp ring laterally slidable on the split collar and the interlocking connection including outwardly projecting lugs on the collar and recesses extending transversely of the inner wall of the clamp ring and through the opposite sides thereof for reception of the lugs, and a flange on one side of the clamp ring adapted to be moved into engagement with corresponding sides of the split collar for limiting sliding movements of the clamp on the split collar, said clamp ring being non-rotatable on the split collar.

EDWARD H. GOLDACKER.